Figure 1:
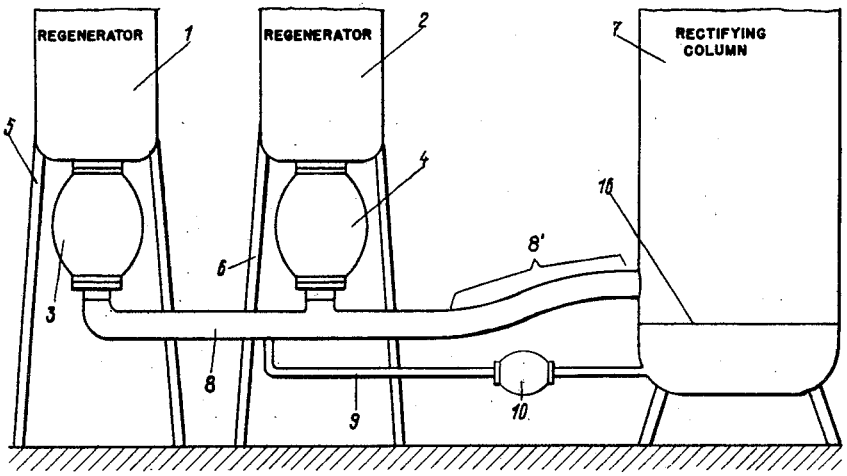

United States Patent Office 3,009,328
Patented Nov. 21, 1961

3,009,328
LOW-TEMPERATURE RECTIFYING PLANT FOR ACETYLENE-CONTAINING GAS MIXTURES
Rudolf Becker, Munich-Solln, Germany, assignor to Gesellschaft für Linde's Eismaschinen Aktiengesellschaft, Hollriegelskreuth, near Munich, Germany, a company of Germany
Filed Sept. 8, 1958, Ser. No. 759,469
Claims priority, application Germany Sept. 14, 1957
2 Claims. (Cl. 62—44)

The invention relates to a rectifying plant for gas mixtures such as acetylene-containing air, designed to operate at low temperature and whose regenerators, arranged vertically on frames, are provided at their lower cold ends with valve casings equipped with valves as outlets for the gas mixture, which casings are connected to a feed pipe, preferably common for all valve casings and connected to the base of the first stage of the rectifying plant.

Known gas mixture rectifying plants of this type are so designed that the feed pipe to the base of the bottom stage of the rectifying column is inclined upwardly at least in part. In schematic representations of such apparatus in the literature this feed pipe is generally shown horizontal or partly horizontal, but this representation is only used for convenience, all connecting pipes being represented as far as possible by vertical or horizontal lines. In practice however, the pipe to the base of the bottom stage of the rectifying column, which is under a pressure that amounts to about 5 atm. abs. in air rectifying plants, is at least partly inclined upwardly. This is necessary because, on the one hand, the regenerators are supported relatively low for reasons of stability, and terminate with their valve casings from which the precooled and pre-purified mixture issues at approximately the same level as the pressure column. On the other hand, it is not possible to lay a horizontal line from the valve casings to the lower end of the pressure column because the pipe must not be welded, for reasons of strength, into the curved bottom of the base. Sufficient compressive strength, even at low temperature, is only ensured if the pipe is welded into the base at a higher point at which it has a cylindrical form.

In the above described known arrangement it is important to keep in mind that a small amount of liquid gas mixture is formed in each regenerator cycle at the cold end of the regenerator. In air rectifying plants it is liquid air. The latter is conducted by way of the valve casings through the connecting pipe line to the pressure column, together with the unliquefied air flowing from the regenerator. The liquid, which does not arrive in the pressure column but remains at the lowest point of the pipe line, evaporates at the end of the hot cycle, the air flowing to the pressure column with a somewhat higher temperature. A disadvantage due to the formation of liquid does not occur in most cases.

The following considerations, which form the basic of the present invention, show, however, that difficulties occur if the gas mixture, that is, the air, is enriched to a relative great extent with constituents that condense more readily than the mixture, paricularly acetylene. Where liquid is formed, it is in equilibrium with the air passing over it. In particular, the acetylene content in the gaseous phase and the acetylene content in the liquid phase are in equilibrium. A numeric example is a content of about 23 p.p.m. $C_2H_2$ in the liquid, with a content of about 0.5 p.p.m. $C_2H_2$ in the gaseous phase (the expression p.p.m." as used herein meaning $10^{-4}$ percent). This content of the liquid is thus higher than that of the pressure column liquid which, formed from air with 0.5 p.p.m. $C_2H_2$ contains in the oxygen-rich fraction oinly 1 p.p.m. $C_2H_2$ as a result of the partial decomposition of the gaseous air in the pressure column.

If the temperature of the liquid flowing from the cold end of the regenerator to the pressure column is the same as that of the gaseous air covering the same path, the liquid remains unchanged in its path. At the end of the hot cycle the air issues from the regenerator hotter than the liquid in the connecting line; consequently the liquid evaporates, and solid acetylene remains as the separation product. This does not occur only when the air passing over it is unsaturated with acetylene and absorbs the thin film of solid acetylene. But if air arrives from the regenerator, the solid acetylene is actually left over, and represents a danger of explosion. This is further increased by the simultaneous enrichment of the liquid with oxygen. In some cases there is the danger of clogging.

Solid separation apparently has not taken place in the gas decomposing plants now in operation, or at least not to any considerable extent that has led to major stoppages but the danger exists according to the foregoing considerations that the above described phenomena will occur at acetylene concentrations of more than 0.5 p.p.m. and particularly at 1–10 p.p.m. in the starting mixture, particularly air.

This danger is avoided according to the invention by such an arrangement, design and dimensioning of the valve casings of the regenerators with the line connecting them to the column base and, if necessary a corresponding arrangement of the regenerators themselves that liquid formed in the line is led off immediately into the base of the column. This is achieved according to a particularly expedient embodiment of the present invention by providing such a narrow and upwardly inclined intermediate connection from each valve casing into a common downwardly inclined pipe terminating in the column base that any liquid formed is carried along by the gas current.

According to another embodiment of the invention a narrow horizontal or downwardly inclined discharge pipe for the liquid, equipped with a check valve, is positioned parallel to the line leading to the column base and connected from the bottom point of this line to a bottom point of the column base. Such a narrow pipe may be welded without danger into the lower part of the base of the pressure column, which has a greater curvature.

Another possibility consists in arranging the regenerators at such a level that all mixture lines are downwardly inclined or horizontal between the regenerators and the column base.

Two arrangements according to the invention are illustrated in the accompanying drawing by way of an example. The reference numerals in both figures refer to the same parts.

In the drawings:
FIG. 1 is a diagrammatic front elevation of one arrangement, and
FIG. 2 is a diagrammatic front elevation of a second arrangement.

Referring to the drawings 1 and 2 are regenerators at whose cold ends are arranged the valve casings 3 and 4. 5 and 6 are the frames carrying the regenerators. 7 is the first stage of a multi-stage rectifying column working as a pressure column.

According to FIG. 1, a relatively large feed pipe 8 is connected to the valve casings 3 and 4. In the section 8' the pipe is inclined upwardly in known manner. Parallel to pipe 8 a substantially narrower pipe 9, having a check valve 10, extends horizontally from the lowest point of the pipe 9, to an equally low point in the bottom of the column base arranged underneath the welded seam 16, through which the liquid accumulating in the pipe 8, can flow off to the pressure column.

Figure 2:
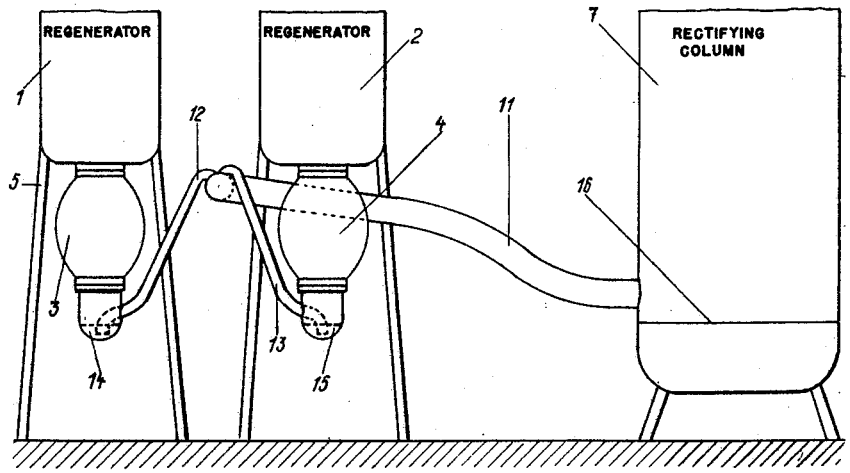

According to the embodiment in FIG. 2, a downwardly inclined pipe 11, is provided as a second feed pipe to the pressure column 7, into which are connected the narrow uptake pipes 12 and 13, from the bottoms of the two valve casings 3 and 4. Pipes 12 and 13 are so narrow that the gaseous mixture traversing them carries along the liquid accumulating at 14 and 15 in the bottoms of the valve casings into the pipe 11.

I claim:

1. A low temperature rectifying plant for acetylene-containing gas mixtures, preferably acetylene-containing air, comprising a plurality of regenerators vertically mounted on frames, each of said regenerators having at its cold end disposed at the bottom a valve casing equipped with a reversing valve as outlet for partially liquefied gas mixture; a rectifying column; a conduit of relatively large cross-section and inclined downwardly towards said rectifying column and connected into the latter adjacent the low end thereof; and upwardly inclined conduits of relatively small cross-section connecting the bottom of each valve casing with the highest point of said relatively large conduit.

2. A low temperature rectifying plant for acetylene-containing gas mixtures, preferably acetylene-containing air, comprising a plurality of regenerators vertically mounted on frames, each of said regenerators having at its cold end disposed at the bottom a valve casing equipped with a reversing valve as outlet for partially liquefied gas mixture; a rectifying column; a conduit of relatively large cross-section upwardly inclined towards said rectifying column and connected between the low ends of said valve casings and the foot of the lowest stage of said rectifying column; and a horizontal second conduit of relatively small cross-section connected from the lowermost point of said relatively large conduit into the bottom of said column.

References Cited in the file of this patent

UNITED STATES PATENTS

| | | |
|---|---|---|
| 1,830,157 | De Baufre | Nov. 3, 1931 |
| 2,256,421 | Borchardt | Sept. 16, 1941 |
| 2,355,660 | Le Rouge | Aug. 15, 1944 |
| 2,433,604 | Dennis | Dec. 30, 1947 |
| 2,541,409 | Cornelius | Feb. 13, 1951 |
| 2,655,796 | Rice | Oct. 20, 1953 |
| 2,827,775 | Linde | Mar. 25, 1958 |